United States Patent Office 2,994,539
Patented Aug. 1, 1961

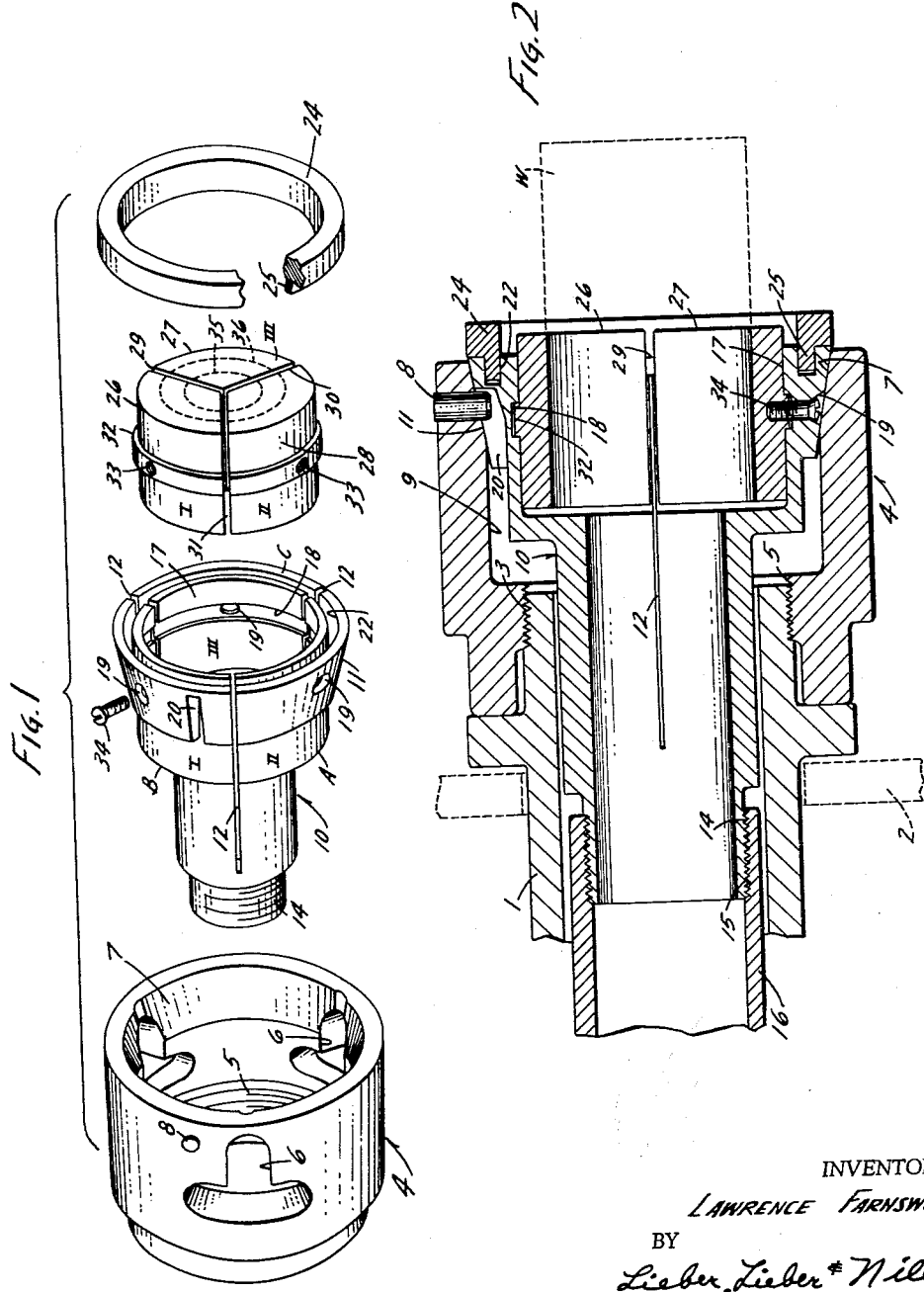

2,994,539
COLLET ASSEMBLY WITH REPLACEABLE SOFT JAW
Lawrence Farnsworth, Racine, Wis., assignor, by direct and mesne assignments, to Heinrich Tools, Inc., Racine, Wis., a corporation of Wisconsin
Filed Dec. 2, 1958, Ser. No. 777,661
6 Claims. (Cl. 279—51)

This invention relates generally to collet chucks for gripping stock to be machined in lathes or other machine tools.

In certain machine tools, such as lathes, it is common practice to utilize slit collets for chucking work to be handled by the lathe. These collets have contractible jaws by means of which the work is gripped when the collet is pulled into the lathe spindle by an axially shiftable collet actuating draw tube.

It is also conventional to provide replaceable jaws of relatively soft metal for these collets thereby eliminating machining of the hardened collet itself to accommodate odd sizes of stock. These soft replaceable jaws eliminate the necessity of shimming the collet jaws apart or soldering them together for regrinding to the correct size.

It is an object of the present invention to provide an improved collet chuck which securely holds a soft blank comprised of a plurality of segments, and which also has a locking ring for precisely and positively holding the blank segments in place. More particularly, the locking ring securely and accurately locates the collet jaws and consequently holds the segments while they are being bored to the same dimension as the workpiece to be subsequently held thereby. The jaws so formed from these blank segments form very accurate and truly concentric jaws for the workpiece. Concentricity of the workpiece, while performing an operation thereon, is assured because the soft jaws were formed with the same tool mounting with which the operation is subsequently performed on the workpiece. Furthermore, these individual jaws may later be quickly and accurately replaced in the collet in the same relationship as they occupied when they were bored from blank segments, to thereby be used again for workpieces of the same size or, alternately, the bore of these jaws may be enlarged to accommodate larger workpieces.

In addition, the above improved collet chuck and its replaceable jaws constitute an oversized nose assembly which can accommodate workpieces of greater diameter than the spindle on which it is mounted.

The present invention also provides a novel collet closer having chip clearance openings which are registerable with the slots of the collet to thereby prevent chips from accumulating on the tapered surfaces of the closer or the collet.

These and other objects and advantages will appear later as this disclosure progresses, reference being had to the accompanying drawings, in which:

FIGURE 1 is an exploded perspective view of a collet chuck assembly made in accordance with the present invention before the soft jaw bank segments have been bored to the desired size;

FIGURE 2 is an enlarged axial cross-sectional view through the assembled device of FIGURE 1 but after the blank has been bored to form the individual jaws.

Referring in greater detail to the drawings, the improved collet chuck assembly has been shown for illustrative purposes as being mounted on a rotatably driven spindle 1 of a lathe 2 having external threads 3 at its outer end.

A cylindrical chuck closer 4 has internal threads 5 by which it is securely engaged with the spindle threads 3 for rotation with the spindle. This closer 4 has a series of generally T-shaped openings 6 circumferentially spaced in its cylindrical wall and also has a tapered internal surface 7 at its forward end. A guide pin 8 is fixed in the closer wall and extends past the tapered surface 7. The closer thus mounts on the outside of the spindle and its internal bore 9 is considerably larger in diameter than the internal diameter of the spindle.

A collet 10 is mounted within the closer but has a tapered surface 11 which complements the tapered surface 7 of the closer. A series of circumferentially spaced slots 12, in this example three in number, are cut longitudinally in the collet to thereby form contractible spring jaws A, B and C, according to conventional practice. The rear end of the collet 10 has external threads 14 thereon which are engaged by the internal threads 15 of a conventional draw bar or collet-actuating tube 16. This tube is adjustable in an axial direction to the left (FIG. 2) in the conventional manner to cause the tapered surface 11 of the collet to bear against the tapered surface 7 of the closer to thereby force the jaws A, B and C to contract to grasp a workpiece, or the tube may be moved to the right to allow the spring jaws to expand, thus releasing the workpiece.

Bar stock may be fed through the draw bar and grasped by the collet from which it rotatably extends to have an operation performed thereon by a tool (not shown) carried by the lathe.

The large jaws A, B and C of the collet 10 utilized in the present invention are located within the large bore 9 of the closer and in themselves present a large internal cylindrical surface 17 that is capable of holding a workpiece W of substantially larger diameter than the internal diameter of the draw bar 16, but of a relatively short length in that it cannot be fed through the draw bar. An annular groove 18 of rectangular shape is formed in the internal surface 17 and an aperture 19 extends through each jaw and terminates in this groove.

A longitudinal slot 20 formed in one of the jaws receives the pin 8 when the collet is assembled in the closer to thereby insure that the slits 12 in the collet and also the space between the soft jaws to be described, are all in radial alignment with their respective chip clearance openings 6. It is thought worthy of emphasis at this point that the discharge of chips from the collet assembly, and the prevention of their accumulation on the tapered surfaces 7 and 11, particularly as the collet is shifted axially, is insured by the openings 6 in the closer.

In accordance with the present invention, a circular locking means in the form of a slot 22 is formed in the outer and enlarged end of the collet, and preferably when the jaws are slightly contracted from their normal or free position. A continuous one-piece locking ring 24 has a flange 25 that is adapted to fit tightly into the slot 22 when the jaws are contracted to the position they occupied when the slot was formed. The ring thus holds the collet jaws in an exact position and prevents these jaws from either expanding or contracting. Other forms of interengaging locking means may be employed between the collet jaws, for example, the jaws may have a flange extending therefrom which would be engaged by a slot in the ring 24. In other words, the relative positions of the slot 22 in the jaws and the flange 25 on the ring could be reversed.

A series of individual jaw blank segments 26, 27 and 28 are formed preferably from a relatively soft and easily machinable cylindrical piece of metal by cutting radial slits 29, 30 and 31 therein. Before these slits are cut, however, a peripheral shoulder 32 is formed around the cylindrical piece, which shoulder complements the groove 18 and fits snugly therein. Each of the jaws has a threaded hole 33 tapped into its shoulder 32 which is in alignment with its respective aperture 19 of the collet jaws. A cap screw 34 securely and accurately locates each of the jaw segments in the collet.

While being held by the collet, these jaw blanks 26—28 are drilled or bored to the same size as the diameter of the work to be held thereby. For example, as indicated by the broken lines in FIGURE 1, a relatively small hole 35 may be formed first, and after all the workpieces of that particular size are completed on the lathe, a larger hole 36 may be bored in the same jaws for accommodating larger diameter workpieces. It is unnecessary, and in fact undesirable to rebore the hard collet jaws themselves, therefore, in order to accommodate various and odd sizes of workpieces. The jaws of the collet itself are locked together while the soft blank segments are bored to the proper size. An absolutely true bore is assured because any errors in the concentricity of the machine spindle or its component parts, or in the collet, have been cancelled out by the formation of the bore in the soft jaws. By providing that the soft jaws will occupy the same position in the collet jaws when later re-used, as they did when the original bore therethrough was formed, by indexing means to be described, this absolute concentricity will be insured.

It is preferably desirable to completely separate the jaw blanks 26—28 from one another before they are bored, to facilitate positioning them within the collet. Stated otherwise, it is easier to assemble the jaw blanks in the collet, and particularly the shoulders 32 in the groove 18, and then screw the jaw blanks tightly in place, if the jaw blanks have been separated from one another.

When the slits 29—31 have been cut in the soft cylindrical blank, the jaw blanks 26—28 may be placed one by one in the collet and secured in place by their respective screws 34. The draw bar 16 is then moved slightly to the left (FIG. 2) to draw the tapered collet surface 11 against the closer surface 7 and thereby slightly close the collet jaws A, B and C. This causes the groove 22 in the front end of the collet jaws to form a concentric shape and one which registers exactly with the locking ring flange 25. This ring is then inserted in the groove 22 which locks the collet jaws together in a predetermined position.

With the jaw blanks locked securely in place, the drill or boring tool (not shown) carried by the carriage (not shown) of the lathe for example, is advanced into the jaw blanks at their point of juncture to form individual jaws of a size to receive a workpiece of the same diametrical size as the tool which bored out the jaw blanks.

After the jaws are thus formed, the locking ring 24 is removed from its slot 22. The workpiece to be machined is then inserted in the soft jaws to be held thereby.

By means of this invention the workpiece is accurately located concentrically in the machine and particularly in respect to that tool and its mounting which will subsequently perform the operation on the workpiece.

These soft jaws are reusable at a later time and contain identifying marks corresponding to marks on the collet jaw to which they were secured when being formed. In other words, each soft jaw and its corresponding collet jaw bear similar marking so that in reuse the soft jaws occupy the same concentrically correct position in the machine that they did when being formed. As shown in FIGURE 1, the soft jaws and their respective collet jaws bear Roman numerals I, II and III to thereby pair them together for future use.

It is also possible to use these soft jaws for larger workpieces by boring them to a larger size, again while the collet jaws are locked together by the ring 24. By locking the collet jaws together, rather than the soft jaws, only one locking ring is necessary for any number of soft jaw blanks.

These soft jaws form a precise locating means and it is neither necessary nor desirable to adjust them individually to the workpiece.

The axial length of the soft jaws is substantial and therefore capable of handling relatively long pieces of stock which protrude considerably out past the jaws. Furthermore, and importantly, workpieces of a diameter substantially larger than that of the draw tube can be handled by this oversized nose assembly.

Various modes of carrying out the invention are contemplated as being within the scope of the following claims particularly pointing out and distinctly claiming the subject matter which is regarded as the invention.

I claim:

1. A collet assembly for connection to a lathe spindle and comprising, a collet having a tubular rear end and also having a larger front end, said front end having axial slits therein which slits define spring jaws, said spring jaws being of such diameter to form an enlarged tubular front end having an internal diameter larger than that of said rear end, said rear end adapted to be connected with an axially shiftable draw tube, a cylindrical closer adapted to be threadably engaged on said spindle and mounted around said collet for engagement by said spring jaws to cause contraction thereof when said draw tube is moved axially, means on each of said jaws for accurately locating and securely holding individual soft jaw blanks, said spring jaws together having a circular locking means formed therein, and a locking ring complementary to and engageable by said means to lock said jaws together while a boring operation is performed on said soft jaw blanks.

2. A collet assembly for connection to a lathe spindle and comprising, a collet having a tubular rear end and also having slits in its front end to define spring jaws, said spring jaws being of such diameter to form an enlarged tubular front end having an internal diameter larger than that of said rear end, said rear end adapted to be connected with an axially shiftable draw tube, a cylindrical closer adapted to be threadably engaged on said spindle and mounted around said collet for engagement by said spring jaws to cause contraction thereof when said draw tube is moved axially, said closer having circumferentially spaced openings therethrough in radial alignment with said collet slits to permit chips to be discharged therethrough, means on each of said jaws for accurately locating and securely holding individual soft jaw blanks, said spring jaws also having a locking groove formed therein, and a locking ring insertable in said grove to lock said jaws together while a boring operation is performed on said soft jaw blanks.

3. A collet assembly for connection to a lathe spindle and comprising, a collet having a tubular rear end and also having slits in its outer end to define spring jaws, said spring jaws being of such diameter to form an enlarged tubular outer end having an internal diameter larger than that of said rear end, said rear end adapted to be connected with an axially shiftable draw tube, a cylindrical closer adapted to be threadably engaged on said spindle and mounted around said collet for engagement by said spring jaws to cause contraction thereof when said draw tube is moved axially, means on each of said jaws for accurately locating and securely holding individual soft jaw blanks, said closer having an opening therethrough and in radial alignment with each of said collet slits to thereby permit the discharge of chips therethrough, interengaging guide means between said closer and collet for insuring radial alignment of said slits and openings, said spring jaws also having a locking groove formed therein, and a locking ring insertable in said groove to lock said jaws together while a boring operation is performed on said soft jaw blanks.

4. A collet assembly comprising, a collet having a tubular rear end and also having slits in its other end to define spring jaws, said rear end adapted to be connected with an axially shiftable draw tube, a cylindrical closer mounted around said collet for engagement by said spring jaws to cause contraction thereof when said draw tube is moved axially, said closer having an opening therethrough and in radial alignment with each of said collet slits to thereby permit the discharge of chips therethrough, interengaging guide means between said closer and collet for insuring radial alignment of said slits and openings, means on each of said jaws for accurately locating and securely holding individual soft jaw blanks, said spring jaws together having a circular locking means, and a locking ring complementary to and engageable with said means to lock said jaws together while a boring operation is performed on said soft jaw blanks.

5. A collet assembly for connection to a lathe spindle and comprising, a collet having a tubular rear end and also having a larger front end, said front end defining a plurality of grasping jaws, said grasping jaws being of such diameter to form an enlarged tubular front end having an internal diameter larger than that of said rear end, a cylindrical closer mounted around said collet for engagement by said grasping jaws to cause contraction thereof, means on each of said grasping jaws for accurately locating and securely holding individual soft jaw blanks, said grasping jaws together defining a circular locking means formed therein, and a locking ring complementary to and engageable by said locking means to lock said jaws together while a boring operation is performed on said soft jaw blanks.

6. An assembly as defined in claim 5 further characterized in that said circular locking means is a groove formed around said front end and said ring is insertable in said groove.

References Cited in the file of this patent
UNITED STATES PATENTS

| | | |
|---|---|---|
| 811,722 | Hoenscheid | Feb. 6, 1906 |
| 1,851,403 | Preston | Mar. 29, 1932 |
| 1,854,825 | Connell | Apr. 19, 1932 |
| 2,105,618 | Silva | Jan. 18, 1938 |
| 2,291,398 | Martin | July 28, 1942 |
| 2,565,330 | Sundt | Aug. 21, 1951 |
| 2,608,414 | Montgomery | Aug. 26, 1952 |